Patented Feb. 9, 1943

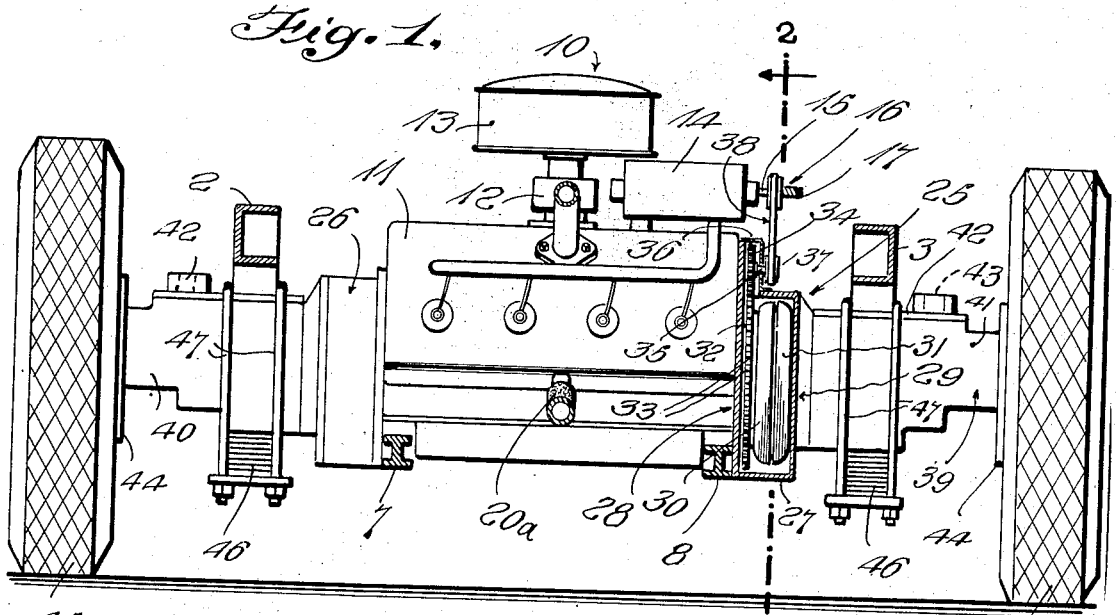

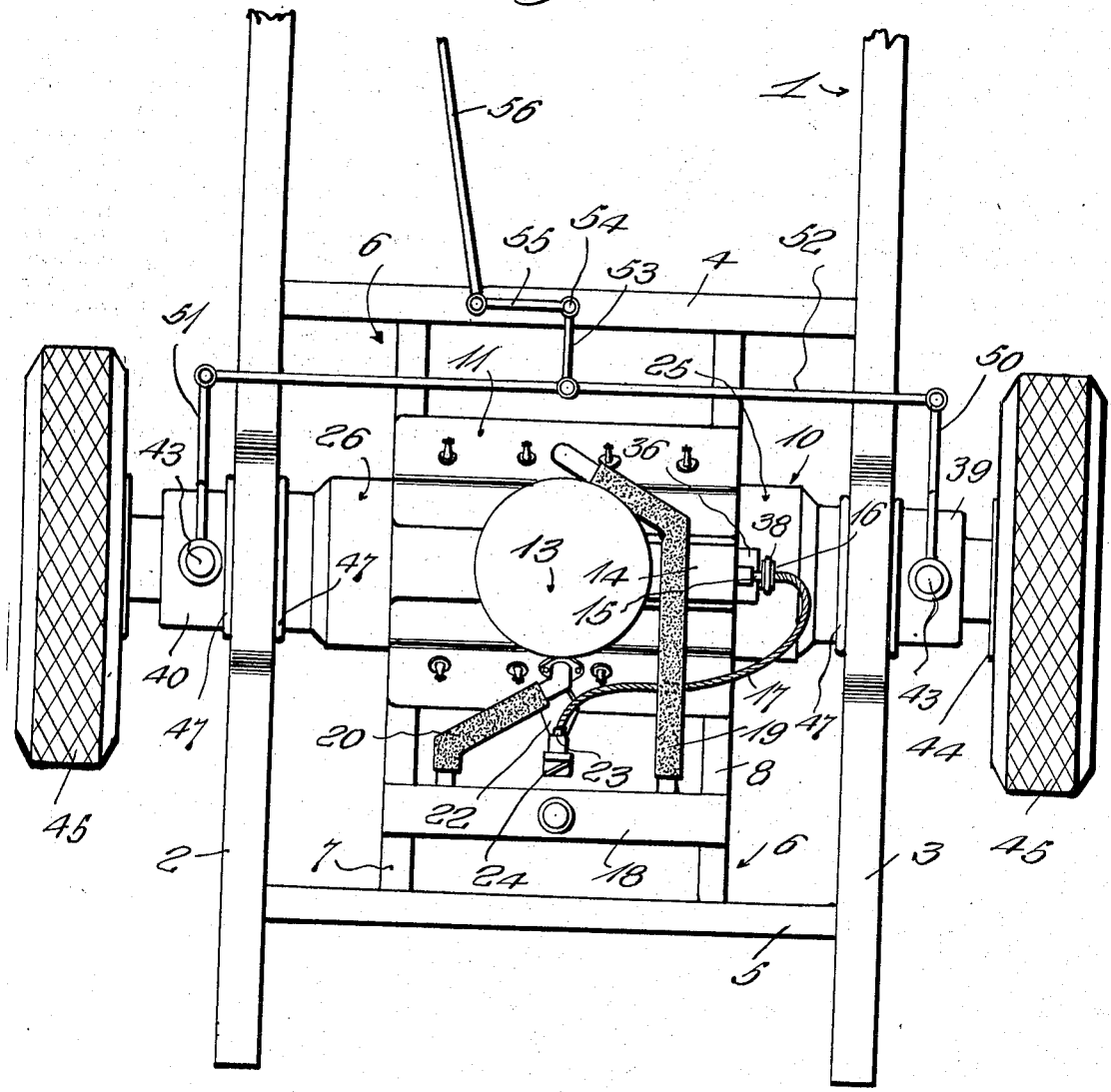

2,310,513

UNITED STATES PATENT OFFICE 2,310,513

POWER AND TRANSMISSION UNIT

Henry N. Burns, Rossburg, Ohio

Application May 22, 1941, Serial No. 394,716

3 Claims. (Cl. 180—62)

This invention relates to power transmission systems and more particularly to an improved power and transmission unit.

One object of the invention is to provide a power and transmission unit which is particularly adapted for use with automobiles, but which may be used with any vehicle, for effectively transmitting power to the driving wheels or treads of the vehicle.

Another object of the invention is to provide a power unit of this character which is mounted transversely of the rear of the vehicle with the result that the wheel base of said vehicle may be lengthened, to increase riding comfort, and the driver's seat may be moved to the forward end of the vehicle, to increase visibility.

A further object of the invention is to provide a power and transmission unit which will include automatic transmission assemblies and fluid drive assemblies but which will eliminate the ordinarily used drive shaft and differential mechanisms.

A further object of the invention is to provide a power and transmission unit by the use of which it will be possible to eliminate the clutch and torque tube ordinarily employed.

A further object of the invention is to provide a power and transmission unit employing two flywheels, gearing and other mechanism for co-operation with the conventional starter, generator and fan.

A still further object of the invention is to provide a power and transmission unit wherein the motor is connected with the driving wheels through the fluid drive assemblies with the result that greater efficiency and economy will be secured from operation of said motor.

And a still further object of the invention is to provide a unit of the class described wherein the mounting of the motor will permit construction of a body having a lower center of gravity, with the result that a greater factor of safety, during operation of the vehicle, will be present.

Further objects of the invention, not specifically mentioned hereinbefore, will become apparent during the course of the following description.

In the drawings forming a part of my application:

Figure 1 is a side view of my improved power and transmission unit, said view being partially broken away and shown in section to disclose one of the fluid drive assemblies and of a portion of the gearing, Figure 2 is a vertical sectional view on the line 2—2 of Figure 1, and Figure 3 is a top plan view of the invention.

In the drawings above briefly described, like numerals of reference will be seen to designate like parts throughout the views.

My invention is shown as it would appear installed on the rear of the automobile. However, it should be understood that the invention may be used with trucks, tractors, or with any vehicle requiring wheels or treads as a means of supplying motion. The numeral 1 indicates in general the chassis or frame of an automobile. The chassis or frame 1 includes side members 2 and 3 and longitudinally spaced cross members 4 and 5. Extending between the cross members 4 and 5 and medially of the width of the frame 1 is a cradle 6, said cradle comprising laterally spaced beams 7 and 8 which have their corresponding forward ends connected to the cross members 4 and their corresponding rear members offset upwardly, as shown at 9 in Figure 2, and connected to the cross member 5.

My improved power and transmission unit is mounted above the cradle 6 and extends transversely of the frame 1 between the cross members 4 and 5. The power and transmission unit is indicated generally by the numeral 10. Said unit includes a motor 11 which is of the V type, or of the straight line type. It has been found that, when the motor is to have more than four cylinders, the V type motor will be used, as this type of motor requires considerably less space for its mounting than do motors having a large number of cylinders mounted in tandem. The motor 11 itself is largely of conventional construction and has a carburetor 12 having an air cleaner 13. A generator 14, of conventional design, is mounted above the motor and is provided with a shaft 15 having a drive pulley 16 thereon. A flexible shaft 17, the purpose for which will be described in more detail hereinafter, is connected with the shaft 15. The motor is of the water cooled type and is cooled by liquid from a radiator 18 which is mounted transversely of the cradle 6 and is supported on the beams 7 and 8 thereof near their corresponding rear ends. The upper tank of the radiator is connected to one of the cylinder blocks of the motor 11 by a flexible hose 19 and with the other of the blocks of said motor by a flexible hose 20. The lower tank of the radiator will be connected with the blocks in a conventional manner by a pipe 24ª.

Mounted on the rearmost block of the motor 11 is a supporting bracket 21, at the upper end of which is formed a bearing 22 which journals a fan shaft 23. The fan shaft 23 carries a cooling fan 24 which is disposed in close spaced relation to the rear surface of the radiator 18. The shaft 23 of the fan 24 is operatively connected with the generator shaft 15 by the flexible shaft 17 so that rotation of the generator shaft will impart rotative movement to the fan for cooling the liquid in the radiator and thus cooling the motor.

The motor 11 is provided with a pair of fluid drive assemblies 25 and 26, the assembly 25 being located at one end of the motor and the assembly 26 being disposed at the opposite end thereof. The units are substantially identical so that a description of one will suffice for both.

The fluid drive assembly 25 includes a casing 27 which is substantially circular in contour and which includes an inner wall 28 which is connected with the end of the motor 11. The assembly 25 also includes an outer wall 29 which is connected integrally with the casing of the associated transmission assembly, to be described hereinafter. Mounted within the casing 25 and operatively connected with the motor 11 is a drive rotor 30, and associated with the drive rotor is a driven rotor 31 which is connected to the drive shaft of the transmission unit to be described hereinafter. The casing 27 also includes a fly wheel 32 which is formed with gear teeth 33. The fly wheel 32 is connected with the driving rotor 30 and the gear teeth 33 mesh with the teeth of a pinion 34 which is mounted on a shaft 35 in an extension 36 of the casing 27. The shaft 35 carries, exteriorly of the extension 36, a pulley 37 which is operatively connected with the pulley 16 of the generator 14 by a belt 38. It will thus be seen that rotation of the fly wheel will cause rotation of the gear 34 and the pulley 37, which rotative movement will be imparted to the shaft 15 through the pulley 16, for causing the generator and the fan to operate for their respective purposes.

Integrally connected with the outer walls 29 of the assemblies 25 and 26 are automatic transmission assemblies 39 and 40. The assemblies 39 and 40 are of identical construction so that it will not be necessary to describe both in detail. The assembly 39 includes a housing 41 which is formed of heavy cast metal and which is reduced in diameter toward its outer end. The housing 41 is closed at its top by a top wall 42 through which extends a control shaft 43, shown in dotted lines. The housing 41 carries the backing plate of a brake drum 44 and said drum is connected with one of the driving wheels which is shown generally at 45. The automatic transmission mechanism is contained within the housing 41 and is operatively connected with the driven rotor 31 of the assembly 25. This mechanism is of well-known construction so that it is not deemed necessary to describe it in detail. Suffice it to say that said mechanism includes fluid drive elements, a reverse gear and one or more forward speed gears. By way of further explanation, it may be stated that the automatic transmission mechanism is similar to that known as the "Hydra-matic" transmission.

The unit 10 is connected with the side members 2 and 3 by springs 46 which have their center portions connected to the assemblies 39 and 40 by means of clips 47. The opposite ends of each of the springs 46 are connected with shackles 48 and 49 on the frame or chassis 1. It will now be seen that the resilient connection is provided for connecting the power and transmission unit, together with the wheels 45, with the chassis.

It should be understood that a starter motor will be mounted on the motor 11 and will be provided with a Bendix gear which will mesh with the teeth of the flywheel for starting the motor.

In operation, when the motor is started, rotative movement will be transmitted to the automatic transmission through the fluid drive assemblies 25 and 26. More specifically, rotation of the drive rotors 30 of the assemblies 25 and 26 will cause rotation of the driven rotors 31 of said assemblies for causing rotation of the drive shafts of the transmission assemblies 39 and 40.

The assemblies 39 and 40 are controlled simultaneously by means of lever and link structure including levers 50 and 51 which are operatively connected to each other by means of a link 52. The link 52 is laterally shifted, for controlling the transmission assemblies, by means of a crank 53 which is pivotally mounted on the cross member 4 by means of a pivot bolt 54. The crank 53 includes an arm 55 to which is connected a control rod 56 which extends forwardly of the vehicle to a point for manual engagement within the driver's compartment.

When the vehicle is in motion, the fluid drive assemblies 25 and 26 will allow slippage when the vehicle is turning a corner so that the usual differential mechanism will not be needed. The transmissions are automatic in operation, except when it is desired to reverse the direction of motion of the vehicle, at which time the rod 56 is shifted for changing the position of the lever and link mechanism.

Attention is directed to the fact that, inasmuch as the automatic transmission assemblies and the fluid drive assemblies are employed, there will be no need for the conventional clutch and drive shaft assemblies. Moreover, in view of the fact that the unit is mounted transversely of the rear of the vehicle, frames may be made without regard to drive shaft lengths. Also, the frames may be made lower so that the center of gravity will be lower, and thus the factor of safety increased.

If desired, universal joints may be employed between the wheels and the transmission assemblies so that all four wheels may be controlled for steering.

It is desired particularly to point out that, inasmuch as the motor is located at the rear of the vehicle, the driver's seat may be moved forwardly for assuring increased visibility, and thus increased safety.

Having thus described the invention, what is claimed as new is:

1. A power and transmission unit including, in combination with a vehicle having a frame, a motor mounted above the frame, a transmission assembly carried at each end of the motor, one of said transmission assemblies including a casing having an extension, drive and driven rotors within the casing, a fly wheel connected with the drive rotor and having teeth, a gear within the extension and meshing with the teeth of the fly wheel, a shaft for said gear, a pulley on the shaft, a generator on the motor and having a shaft provided with a pulley, a belt operatively connecting the pulleys, a bracket carried by the motor and having a bearing, a fan having a shaft rotatable in the bearing, a radiator mounted on the frame rearwardly of the fan and in close spaced relation thereto, a flexible shaft connecting the generator shaft with the fan shaft, a transmission assembly connected with each of the fluid drive assemblies, wheels connected with the transmission assemblies, means resiliently connecting the power and transmission unit with the frame, said fluid drive and transmission assemblies transmitting rotative movement from the motor to the wheels and said flexible shaft transmitting rotative movement from the generator shaft to the fan for cooling the liquid in the radiator, and means operatively connecting the radiator with the motor.

2. A power and transmission unit including, in combination with a vehicle having a frame and a radiator mounted on the frame, a motor, a clutch drive assembly mounted at each end of the motor, each of said clutch drive assemblies including a casing and the casing of one of said fluid drive assemblies having an extension, a fly wheel in the casing, a gear in the extension and meshing with teeth on the fly wheel, said gear having a shaft, a pulley on the shaft, a generator on the motor and having a shaft and a pulley, means operatively connecting the pulleys, a fan mounted on the motor in spaced relation to the radiator, and means operatively connecting the fan with the generator shaft, said fan being rotatable for cooling liquid in the radiator upon rotation of the generator shaft.

3. A power and transmission unit as recited in claim 2, wherein said last-mentioned means comprises a flexible cable.

HENRY N. BURNS.